United States Patent
Yoshida et al.

(10) Patent No.: US 10,763,554 B2
(45) Date of Patent: Sep. 1, 2020

(54) RECHARGEABLE BATTERY PROTECTING APPARATUS AND POWER STORAGE SYSTEM

(71) Applicant: MITSUBISHI ELECTRIC CORPORATION, Chiyoda-ku, Tokyo (JP)

(72) Inventors: Yukihiro Yoshida, Tokyo (JP); Sho Shiraga, Tokyo (JP); Satoshi Hara, Tokyo (JP); Yuruki Okada, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/097,493

(22) PCT Filed: May 17, 2016

(86) PCT No.: PCT/JP2016/064571
§ 371 (c)(1),
(2) Date: Oct. 29, 2018

(87) PCT Pub. No.: WO2017/199326
PCT Pub. Date: Nov. 23, 2017

(65) Prior Publication Data
US 2019/0148796 A1 May 16, 2019

(51) Int. Cl.
*H02J 7/00* (2006.01)
*H01M 10/44* (2006.01)
(Continued)

(52) U.S. Cl.
CPC ......... *H01M 10/445* (2013.01); *H01M 10/46* (2013.01); *H01M 10/48* (2013.01);
(Continued)

(58) Field of Classification Search
CPC .... H01M 10/44; H01M 10/445; H01M 10/46; H01M 10/48; H01M 10/486; H02J 7/00;
(Continued)

(56) References Cited

U.S. PATENT DOCUMENTS

| 2010/0052692 A1* | 3/2010 | Yano | H01M 2/1083 |
| | | | 324/427 |
| 2010/0076005 A1* | 3/2010 | Ingrassia | C07D 491/06 |
| | | | 514/280 |

FOREIGN PATENT DOCUMENTS

| JP | 2010011619 A | 1/2010 |
| JP | 2015115219 A | 6/2015 |
| JP | 5793957 B2 | 10/2015 |

* cited by examiner

*Primary Examiner* — Vuthe Siek
(74) *Attorney, Agent, or Firm* — Buchanan Ingersoll & Rooney PC

(57) ABSTRACT

A deteriorated capacity calculator calculates a deteriorated capacity that is a capacity reduced from the capacity of a cell in an initial state. A gas amount calculator calculates an amount of gas contained in a container for the cell, from the deteriorated capacity. A pressure calculator calculates a pressure inside the container for the cell from the amount of the gas, a volume of a void space of the container for the cell and the temperature of the cell. A pressure monitor outputs a control signal for stopping charging or discharging of the battery when the pressure inside the container for at least any one cell is equal to or greater than a threshold pressure.

12 Claims, 7 Drawing Sheets

(51) Int. Cl.
  *H01M 10/48* (2006.01)
  *H01M 10/46* (2006.01)
(52) U.S. Cl.
  CPC ......... *H01M 10/486* (2013.01); *H02J 7/0029* (2013.01); *H02J 7/0068* (2013.01); *H02J 7/00302* (2020.01)
(58) Field of Classification Search
  CPC ............. H02J 2007/0037; H02J 7/0029; H02J 7/0068; H02J 7/00302
  See application file for complete search history.

RECHARGEABLE BATTERY PROTECTING APPARATUS AND POWER STORAGE SYSTEM

TECHNICAL FIELD

The present disclosure relates to a rechargeable battery protecting apparatus for detecting a pressure increase in a container for a cell included in a rechargeable battery and a power storage system.

BACKGROUND ART

During charging of or discharging of a rechargeable battery, gas may occur in a container for a cell included in the rechargeable battery depending on conditions for use of the rechargeable battery and thus cause pressure to increase in the container. When pressure in the container reaches pressure that causes activation of a safety valve provided for the container, the safety valve is activated which in turn releases the gas from the container to the outside. As a result, bursting of the container for the cell can be prevented. However, since the gas released by the operation of the safety valve is combustible electrolyte vapor, the gas may affect human health and may ignite. Therefore, stopping charging of or discharging of the rechargeable battery before activation of the safety valve is desirable.

A battery pack disclosed in Patent Literature 1 includes cells and determines whether there occurs dilatation of the cells by detecting contact between conductors placed on main walls of cell casings for the cells. An electric vehicle control device disclosed in Patent Literature 2 measures internal pressure of a secondary battery with a sensor, and in a case where the internal pressure is greater than a threshold pressure, the electric vehicle control device displays information about occurrence of malfunction of the battery, forbids the secondary battery from being charged, and stops an engine. A battery charge controlling device disclosed in Patent Literature 3 detects a pressure increase in a container based on a signal outputted from a strain sensor that is provided for the container that houses cells.

CITATION LIST

Patent Literature

Patent Literature 1: Unexamined Japanese Patent Application Kokai Publication No. 2015-115219
Patent Literature 2: Japanese Patent No. 5793957
Patent Literature 3: Unexamined Japanese Patent Application Kokai Publication No. 2010-011619

SUMMARY OF INVENTION

Technical Problem

A large-scale power storage system mounted on an electric-powered vehicle or a railroad vehicle is equipped with a rechargeable battery including tens of or hundreds of cells. Therefore, in a case of the use of the techniques disclosed in Patent Literature 1, there is a need to provide the power storage system with a large number of conductors, which results in a complicated structure of the system. Moreover, for the purpose of downsizing a power storage system, there is a need to space the cells together as closely as possible. Therefore, in the case where conductors are placed in a power storage system in such a manner as disclosed in Patent Literature 1, there is a need to accurately place the conductors in order to prevent the conductors from coming into contact with one another in a normal situation where the cells do not dilate, which causes difficulty in making the system. Also in the electric vehicle control device disclosed in Patent Literature 2 and in the battery charge controlling device disclosed in Patent Literature 3, there is a need to provide the devices with a large number of sensors in accordance with a large number of cells, which results in complexity of structures of the devices.

The present disclosure is made in order to solve the aforementioned problems, and thus an objective of the present disclosure is to simplify a structure for detecting a pressure increase in a container for a cell included in a rechargeable battery.

Solution to Problem

In order to achieve the above objective, a rechargeable battery protecting apparatus according to the present disclosure includes a deteriorated capacity calculator, a gas amount calculator, a pressure calculator, and a pressure monitor. The deteriorated capacity calculator calculates, from voltages and currents of cells included in a rechargeable battery, deteriorated capacities that are capacities by which capacities of the cells that are in initial states are reduced. The gas amount calculator calculates, from the deteriorated capacities calculated by the deteriorated capacity calculator, amounts of gas contained in containers for the cells. The pressure calculator calculates pressure inside of the containers, from the amounts of gas calculated by the gas amount calculator, void volumes of the containers for the cells and temperatures of the cells. The pressure monitor determines whether pressure inside of a container that is calculated by the pressure calculator is equal to or greater than a threshold pressure with respect to at least any one of the cells.

Advantageous Effects of Invention

According to the present disclosure, a structure for detecting a pressure increase in a container for a cell included in a rechargeable battery can be simplified by calculating an amount of gas contained in the container from a deteriorated capacity and then calculating pressure of the inside of the container from the amount of the gas.

DESCRIPTION OF EMBODIMENTS

Embodiments of the present disclosure are described in detail hereinafter with reference to drawings. Components that are the same or equivalent are assigned the same reference signs throughout the drawings.

Embodiment 1

Figure 1:
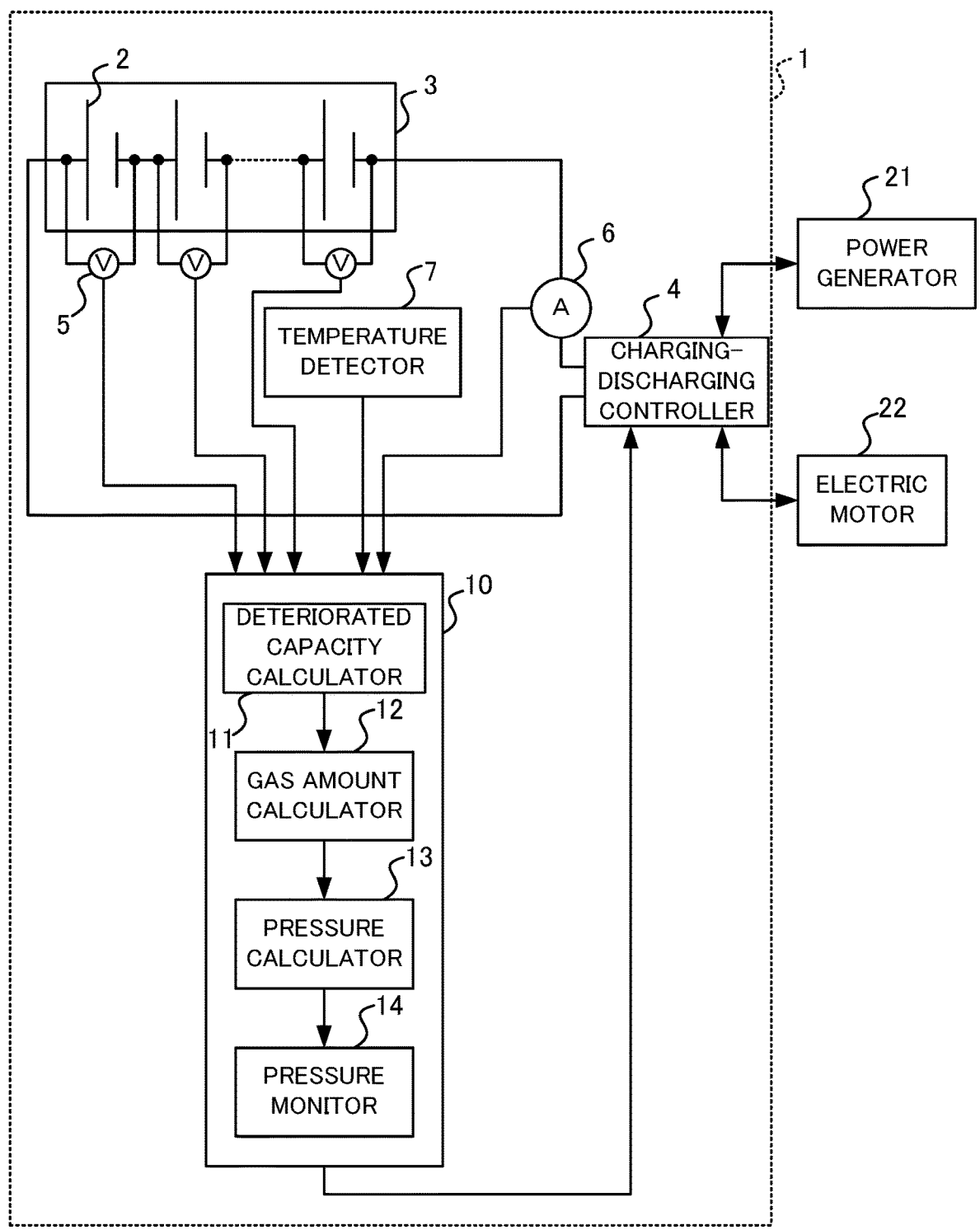
FIG. 1 is a block diagram illustrating an example of a configuration of a power storage system according to Embodiment 1 of the present disclosure.

FIG. 1 is a block diagram illustrating an example of a configuration of a power storage system according to Embodiment 1 of the present disclosure. A power storage system 1 includes a rechargeable battery 3 containing at least one cell 2, a charging-discharging controller 4 to control charging of and discharging of the rechargeable battery 3, a voltage detector 5 to detect a voltage of the cell 2, a current detector 6 to detect a current of the cell 2, a temperature detector 7 to detect a temperature of the cell 2, and a rechargeable battery protecting apparatus 10 to output a control signal for stopping charging of or discharging of the rechargeable battery 3 when pressure inside of a container for the at least one cell 2 is equal to or greater than a threshold pressure. The charging-discharging controller 4 charges the rechargeable battery 3 using power supplied from a power generator 21 and makes the rechargeable battery 3 discharge to supply discharged electricity to an electric motor 22. The charging-discharging controller 4 stops charging of or discharging of the rechargeable battery 3 when the charging-discharging controller 4 receives from the rechargeable battery protecting apparatus 10 a control signal for stopping charging of or discharging of the rechargeable battery 3.

In the example illustrated in FIG. 1, although the rechargeable battery 3 includes cells 2 that are electrically connected to one another, the rechargeable battery 3 may have a single cell 2. Each of the cells 2 is provided with the voltage detector 5. With respect to each cell 2, the temperature detector 7 may acquire, as a temperature of the cell 2, a temperature detected by a temperature sensor provided on the outside of a container for the cell 2 or, alternatively, the temperature detector 7 may estimate a temperature of each of the cells 2 from (i) a temperature detected by a temperature sensor provided for a cell 2 located in the central portion of the inside of a housing of the rechargeable battery 3; and (ii) a temperature detected by a temperature sensor provided for a cell 2 located in a peripheral portion of the inside of the housing. Also, the temperature detector 7 may acquire as a temperature of the cell 2 the average of or the median of temperatures detected by temperature sensors.

The rechargeable battery protecting apparatus 10 includes a deteriorated capacity calculator 11 to calculate a deteriorated capacity that is a capacity by which an capacity of a cell 2 that is in an initial state is reduced, a gas amount calculator 12 to calculate an amount of gas contained in a container for the cell 2, a pressure calculator 13 to calculate pressure of the inside of the container, and a pressure monitor 14 to output a control signal for stopping charging of or discharging of the rechargeable battery 3 when a pressure calculated by the pressure calculator 13 is equal to or greater than the threshold pressure with respect to at least one of the cells 2. The deteriorated capacity calculator 11, the gas amount calculator 12, the pressure calculator 13, and the pressure monitor 14 each include: a processor that includes a central processing unit (CPU), an internal memory, and the like; and a memory that includes a random access memory (RAM), a flash memory, and the like. The deteriorated capacity calculator 11, the gas amount calculator 12, the pressure calculator 13, and the pressure monitor 14 each run a control program stored in the memory to perform various operations and output of a control signal.

The deteriorated capacity calculator 11 calculates a deteriorated capacity that is a capacity by which a capacity of the cell 2 that is in an initial state is reduced, from a voltage value of and a current value of the cell 2. The deteriorated capacity calculator 11 may calculate the deteriorated capacity using temperature of the cell 2 together with the voltage value of and the current value of the cell 2. The term, "initial state", represents a state in which a cell 2 is not yet subjected to deterioration progress, such as a state of the cell 2 at the time when a rechargeable battery including the cell 2 is shipped from a battery manufacturer. A capacity of the cell 2 that is in the initial state may be defined by a value disclosed as a design value or by a value obtained by measuring a capacity of the cell 2 that is in the initial state.

The deteriorated capacity calculator 11 calculates a capacity of the cell 2 and then calculates, as a deteriorated capacity, a difference between: the calculated capacity; and the capacity of the cell 2 that is in the initial state. Alternatively, the deteriorated capacity calculator 11 may calculate an internal resistance of the cell 2 based on voltages of the cell 2 obtained by supplying various charging currents to the cell 2; and then calculate a deteriorated capacity based on a ratio of the calculated internal resistance to an internal resistance of the cell 2 that is in the initial state. Alternatively, the deteriorated capacity calculator 11 may use a relationship between a quantity of electricity and an open voltage obtained by performing charging of and discharging of cells 2 different from one another in degree of deterioration; and then calculate a deteriorated capacity based on the quantity of electricity of the cell 2 obtained by taking the integral of electric current detected by the current detector 6. Alternatively, the deteriorated capacity calculator 11 may change a value of resistance of a charge-discharge circuit connected to the rechargeable battery 3 at least once during charging or discharging; calculate an internal resistance using a voltage value and current value of the cell 2 generated at the time when the change of a value of resistance of the charge-discharge circuit is made; calculate a present capacity of the cell 2 using a relationship between a quantity of electricity and an open voltage calculated using the internal resistance; and calculate, as a deteriorated capacity, a difference between the present capacity of the cell 2 and the capacity of the cell 2 that is in an initial state.

The gas amount calculator 12 calculates an amount of gas contained in a container for the cell 2 using the deteriorated capacity calculated by the deteriorated capacity calculator 11. In Embodiment 1, an amount of substance of the gas is used as an amount of the gas. In the case where constituents of an electrolyte of the cell 2 is already known, the gas amount calculator 12 calculates an amount of substance of the gas generated due to deterioration of the cell 2 using a deteriorated capacity and the formula of a chemical reaction of the electrolyte caused by the deterioration of the cell 2. For example, in a case where the cell 2 is a lithium-ion cell, an ion conductive coating is formed on a surface of a negative electrode by a reduction reaction between the electrolyte and lithium ions. When the lithium ions are captured by the ion conductive coating formed on the negative electrode, lithium ions contributing to charging and discharging reactions are decreased. Since an amount of the lithium ions captured by the ion conductive coating and a deteriorated capacity have a correlation with each other, the amount of the lithium ions captured by the ion conductive coating can be calculated using the deteriorated capacity.

Since gas is generated when the ion conductive coating is formed, an amount of formation of the ion conductive coating and an amount of gas generation have a proportional relationship to each other. Therefore, the amount of gas generation can be calculated using the deteriorated capacity. A chemical reaction formula expressing formation of ion conductive coating is described as formula (1) below. A coefficient x denotes an amount of substance of constituent molecules of the electrolyte reacting with one mole of electrons. A coefficient y denotes an amount of substance of gas generated per mole of electrons when the ion conductive coating is formed. A coefficient r denotes an amount of substance of the ion conductive coating formed per mole of electrons.

[Formula 1]

$$x \text{ (constituent molecules of the electrolyte)} + Li^+ + e^- \rightarrow r \text{ (ion conductive coating)} + y \text{ (gas)} \quad (1)$$

For example, in the case where dimethyl carbonate is used as the electrolyte, as described in formula (2) below, $x=\frac{1}{2}$ moles of dimethyl carbonate ($C_3H_6O_3$) that is constituent molecules of the electrolyte reacts with one mole of electrons, and then a coating of $r=\frac{1}{2}$ moles of lithium carbonate ($Li_2Co_3$) is formed and $y=\frac{1}{2}$ moles of ethane gas ($C_2H_6$) is generated.

[Formula 2]

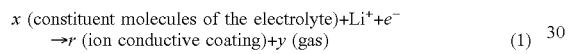

$$\tfrac{1}{2}C_3H_6O_3 + Li^+ + e^- \rightarrow \tfrac{1}{2}Li_2CO_3 + \tfrac{1}{2}C_2H_6 \quad (2)$$

The gas amount calculator 12 calculates an amount of substance $n_1$ of the gas generated due to deterioration of the cell 2 using the deteriorated capacity Z (unit: C), the above coefficients described in formula (1) and the Faraday constant $F=9.65\times10^4$ (unit: C/mol), as described in formula (3) below.

[Formula 3]

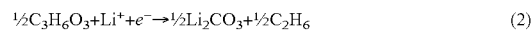

$$n_1 = \frac{Z[C]}{F[C/\text{mol}]} \cdot y \quad (3)$$

The gas amount calculator 12 acquires a volume of a void space of the container for the cell 2. The volume of the void space is obtained by subtracting the volume of components of the cell 2 such as electrodes and the electrolyte from the volume of the container for the cell 2. The volume of the void space can be calculated using a design value. An amount $n_0$ of the gas contained in the container for the cell 2 in the initial state can be calculated using equilibrium vapor pressure of the electrolyte inside the cell 2 that is in the initial state and the volume of the void space at temperature of environment of usage of the rechargeable battery. For example, since moisture is removed from a container for a lithium-ion cell as much as possible and the container is sealed in process for production of the lithium-ion cell, the void space of the container can be deemed as not containing air or water. Therefore, the amount of substance $n_0$ of the gas contained in the container for the cell 2 in the initial state can be calculated using the volume V of the void space (unit: L) in the normal state (at 0 C.° and at a pressure of 1 atm) as described in formula (4) below.

[Formula 4]

$$n_0 = \frac{V[L]}{22.4[L/\text{mol}]} \quad (4)$$

The gas amount calculator 12 calculates the sum of the amount of substance $n_1$ of the gas generated due to deterioration of the cell 2 and the amount of substance $n_0$ of the gas contained in the container for the cell 2 in the initial state.

The pressure calculator 13 calculates pressure $P_1$ of the inside of the container for the cell 2 using (i) the amount of the gases calculated by the gas amount calculator 12, that is, the sum of the amounts of substance of the gases, $(n_0+n_1)$, (ii) the volume of the void space V, and (iii) temperature $T_1$ (unit: K) detected by the temperature detector 7, as described in formula (5) below. A symbol, "R", described in formula (5) denotes the gas constant (unit: Pa·L/K·mol).

[Formula 5]

$$P_1 = \frac{(n_0+n_1)\cdot R \cdot T_1}{V} \quad (5)$$

Figure 2:
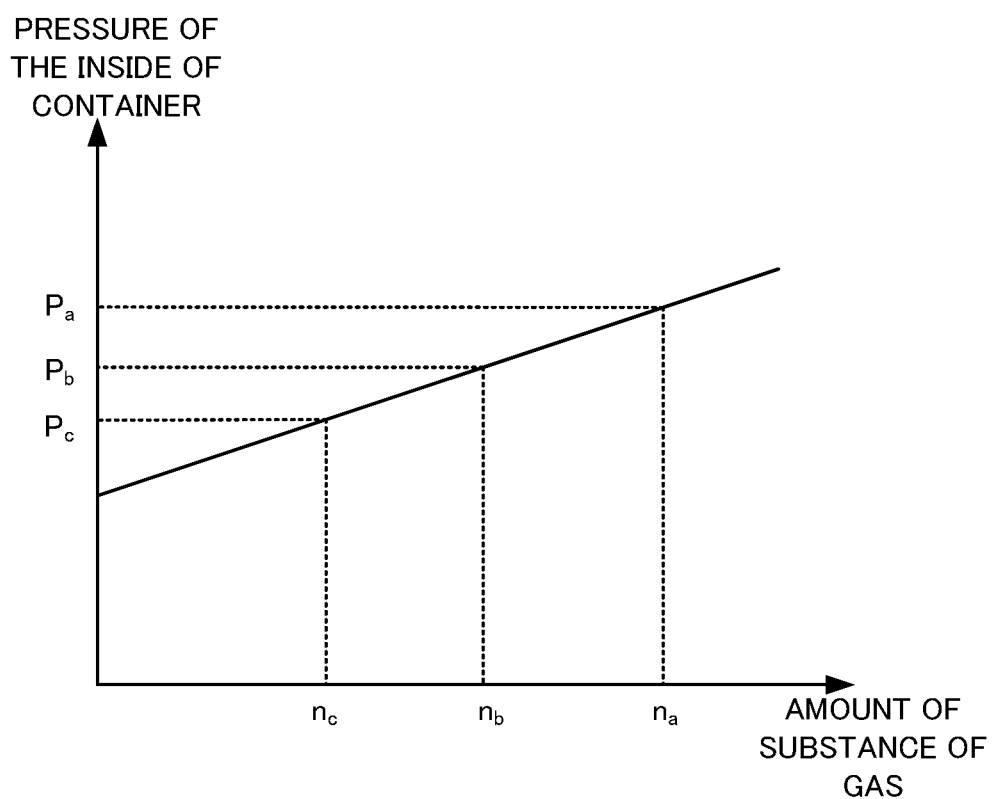
FIG. 2 is a drawing illustrating an example of a relationship between pressure inside of a container and an amount of substance of gas in the container in Embodiment 1.

The pressure monitor 14 outputs, to the charging-discharging controller 4, a control signal for stopping charging of or discharging of the rechargeable battery 3 when pressure $P_1$ of the inside of a container for at least one of the cells 2 is equal to or greater than the threshold pressure. As is clear from formula (5) described above, the pressure $P_1$ of the inside of the container is proportional to the amount of substance $(n_0+n_1)$ of the gases contained in the container. FIG. 2 is a drawing illustrating an example of a relationship between pressure inside of a container and an amount of substance of gas in the container in Embodiment 1. In FIG. 2, an amount of substance of the gases is taken on the horizontal axis and pressure of the inside of the container is taken on the vertical axis. In the example illustrated in FIG. 2, $P_a$ denotes pressure at which a safety valve is activated, and $n_a$ denotes an amount of the gases at the time when the pressure $P_1$ of the inside of the container reaches $P_a$. In the case where stopping charging of or discharging of the rechargeable battery 3 before the safety valve is activated is preferable, the pressure monitor 14 uses, as the threshold pressure, pressure $P_b$ that is smaller than $P_a$. That is, the pressure monitor 14 outputs a control signal for stopping charging of or discharging of the rechargeable battery 3 at the time when the pressure $P_1$ of the inside of the container reaches $P_b$.

Also, a signal for indicating rise in pressure of the inside of the container may be outputted before the control signal for stopping charging of or discharging of the rechargeable battery 3 is outputted. The pressure monitor 14 may output, to the charging-discharging controller 4 at the time when the pressure $P_1$ of the inside of the container reaches $P_c$, the signal for indicating rise in pressure of the inside of the container using $P_c$ that is smaller than $P_b$. For example, when the charging-discharging controller 4 is configured to reduce an amount of charge or discharge after receiving the signal for indicating rise in pressure of the inside of the container, rise in pressure of the inside of the container can be suppressed or prevented. For example, the values of $P_b$ and $P_c$ may be defined based on the strength of the container for the cell 2 and a safety level required in accordance with the intended usage of the power storage system 1.

Figure 3:
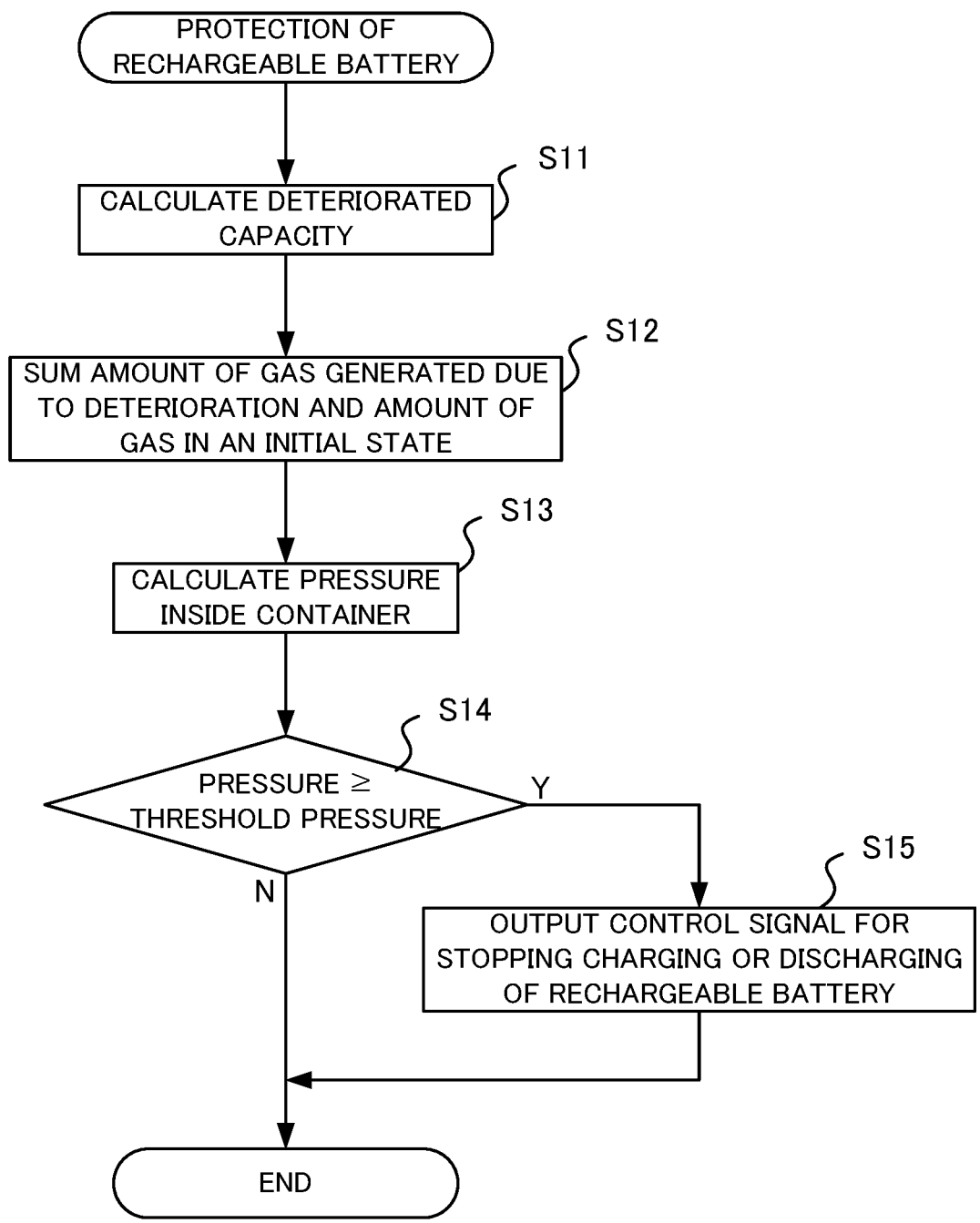
FIG. 3 is a flow chart illustrating an example of an operation of a process of rechargeable battery protection that is performed by a rechargeable battery protecting apparatus according to Embodiment 1.

FIG. 3 is a flow chart illustrating an example of an operation for a process of rechargeable battery protection that is performed by a rechargeable battery protecting apparatus according to Embodiment 1. The deteriorated capacity calculator 11 calculates a deteriorated capacity of the cell 2 (step S11). The gas amount calculator 12 (i) calculates an amount of substance of gas generated due to deterioration of the cell 2 using the deteriorated capacity and the formula of a chemical reaction of electrolyte caused by the deterioration of the cell 2 and (ii) adds up the amount of substance of the generated gas and the amount of substance of gas contained in the container for the cell 2 in the initial state to calculate the amount of substance of the gases contained in the container (step S12). The pressure calculator 13 calculates pressure of the inside of the container for the cell 2 using the amount of substance of the gases contained in the container that is calculated by the gas amount calculator 12, the void volume, and temperature of the cell 2 (step S13). The pressure monitor 14 determines whether the pressure of the inside of the container calculated by the pressure calculator 13 is equal to or greater than the threshold pressure (step S14). In the case where the pressure of the inside of the container is less than the threshold pressure (NO in step S14), the process of the rechargeable battery protection is terminated. In the case where the pressure of the inside of the container is equal to or greater than the threshold pressure (YES in step S14), the pressure monitor 14 outputs a control signal for stopping charging of or discharging of the rechargeable battery 3 (step S15) to terminate the process of the rechargeable battery protection. The rechargeable battery protecting apparatus 10 repeatedly executes the above process of rechargeable battery protection at freely-determined intervals. The deteriorated capacity and the amount of substance of gases calculated in the latest process of rechargeable battery protection may be used, and thus re-executing step S11 of calculating the deteriorated capacity and step S12 of calculating the amount of substance of the gases each time the above process of rechargeable battery protection is repeated is unnecessary.

As described above, the rechargeable battery protecting apparatus 10 according to Embodiment 1 of the present disclosure does not need any strain gauge or any conductor provided for a cell container, and Embodiment 1 of the present disclosure can simplify a mechanism for detecting a rise in pressure inside of a container for the cell 2. Deformation of the cell container is required in order to detect contact of a conductor provided for the cell container, and thus hard-to-deform containers cannot be used. However, the rechargeable battery protecting apparatus 10 according to Embodiment 1 can detect a rise in pressure inside of a container for a cell 2 regardless of qualities of material of the container for the cell 2. Also, in the case where the contact of the conductor is detected, any intermediate pressure rising up to a given pressure inside of the container cannot be detected, but the rechargeable battery protecting apparatus 10 according to Embodiment 1 of the present disclosure can also detect any intermediate pressure rising up to the given pressure inside of the container and can perform control for battery protection with a safety margin at various levels in accordance with the intended usage of the power storage system 1.

Embodiment 2

In Embodiment 1, constituents of an electrolyte of a cell 2 are already known, and the gas amount calculator 12 calculates an amount of substance of gas generated due to deterioration of the cell 2 using a deteriorated capacity and the formula of a chemical reaction of the electrolyte caused by the deterioration of the cell 2. However, in some cases, constituents of an electrolyte of the cell 2 are undisclosed or no formula of a chemical reaction of an electrolyte caused by deterioration of the cell 2 is known. Accordingly, a rechargeable battery protecting apparatus 10 according to Embodiment 2 is configured to calculate an amount of substance of gas contained in a container for the cell 2 using a relationship between a deteriorated capacity and the amount of substance of the gas contained in the container for the cell 2, the relationship being obtained by performing an overcharge test in which each of the cells 2 different from one another in deteriorated capacity is charged by applying to each cell 2 a voltage beyond an acceptable range of charging voltages determined for the cells 2 until pressure of the inside of each of the containers reaches the pressure at which the safety valve is activated.

Figure 4:
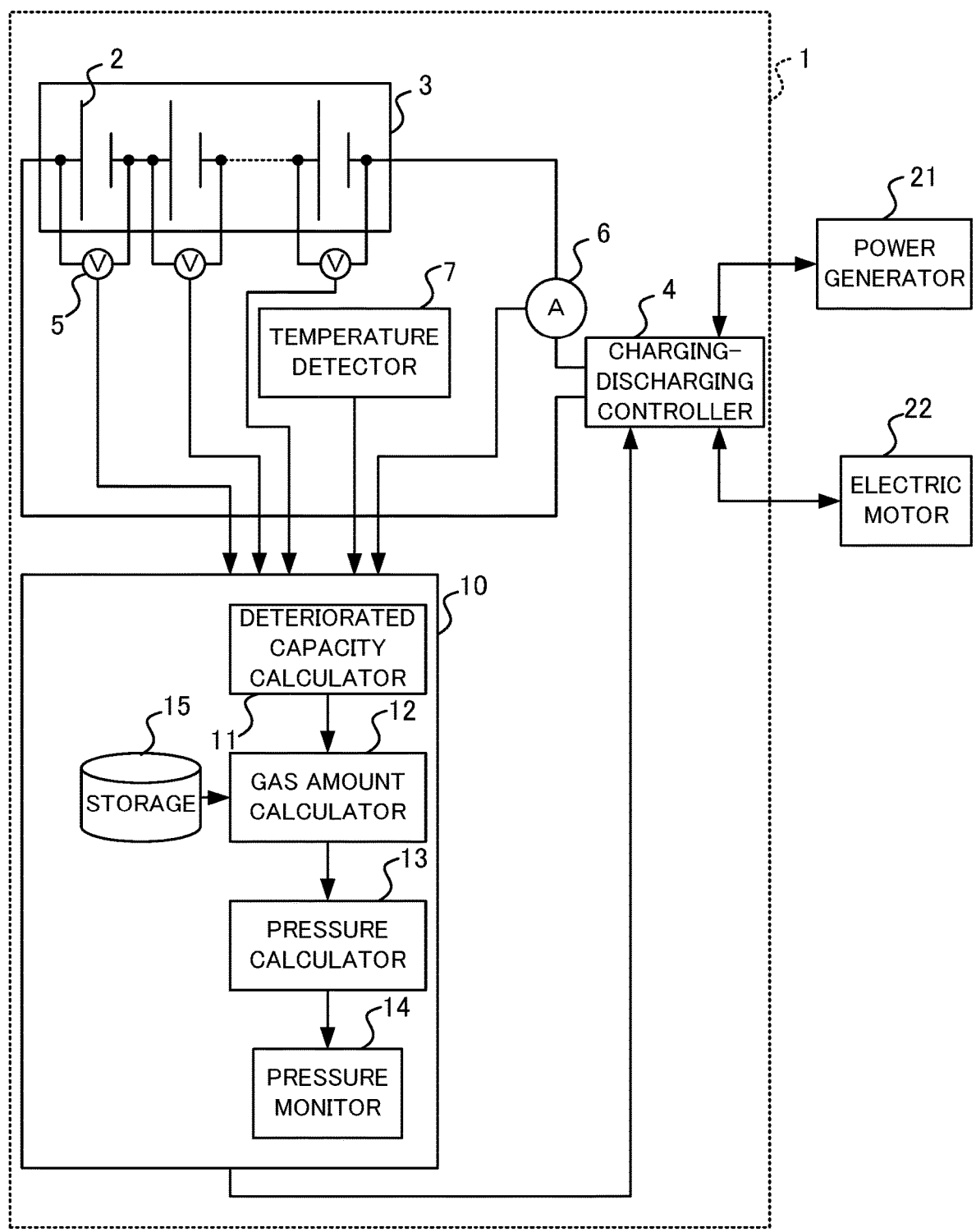
FIG. 4 is a block diagram illustrating an example of a configuration of a power storage system according to Embodiment 2 of the present disclosure.

FIG. 4 is a block diagram illustrating an example of a configuration of a power storage system according to Embodiment 2 of the present disclosure. The rechargeable battery protecting apparatus 10 according to Embodiment 2 includes not only the components of the rechargeable battery protesting apparatus 10 according to Embodiment 1 but also a storage 15. The relationship between a deteriorated capacity and an amount of substance of gas contained in a container for the cell 2 is stored on the storage 15. The gas amount calculator 12 calculates an amount of the gas using a deteriorated capacity calculated by the deteriorated capacity calculator 11 and on the basis of the relationship between the deteriorated capacity and the amount of substance of the gas contained in the container for the cell 2, the relationship being stored on the storage 15.

In the case where the range of charging voltages for the cells 2 is 2.5 V to 4.2 V, an overcharge test is performed by charging each of the cells 2 different from one another in deteriorated capacity by applying 4.5 volts to each of the cells 2 for example. Since the cells 2 deteriorate in proportion to the square root of the length of time that has elapsed from the time when the cells are in the initial states, multiple cells of the same type that are different from one another in the length of time having elapsed from the time when the cells are in the initial states can be used as the cells 2 different in deteriorated capacity. A case where cells 2a, 2b and 2c different from one another in deteriorated capacity are subjected to an overcharge test is described as an example below. The cell 2a is the least deteriorated cell of the cells 2a, 2b and 2c, and the cell 2c is the most deteriorated cell of the cells 2a, 2b and 2c. The cells 2a, 2b and 2c differ from one another in amount of gas contained in a container. Since a set value of pressure at which the safety valve is activated is a design value and common to the cells 2a, 2b and 2c, the cells 2a, 2b and 2c differ from one another in amount of gas caused by the overcharge test until the safety valve is activated when the cells 2a, 2b and 2c different in deteriorated capacity are subjected to the overcharge test.

Figure 5:
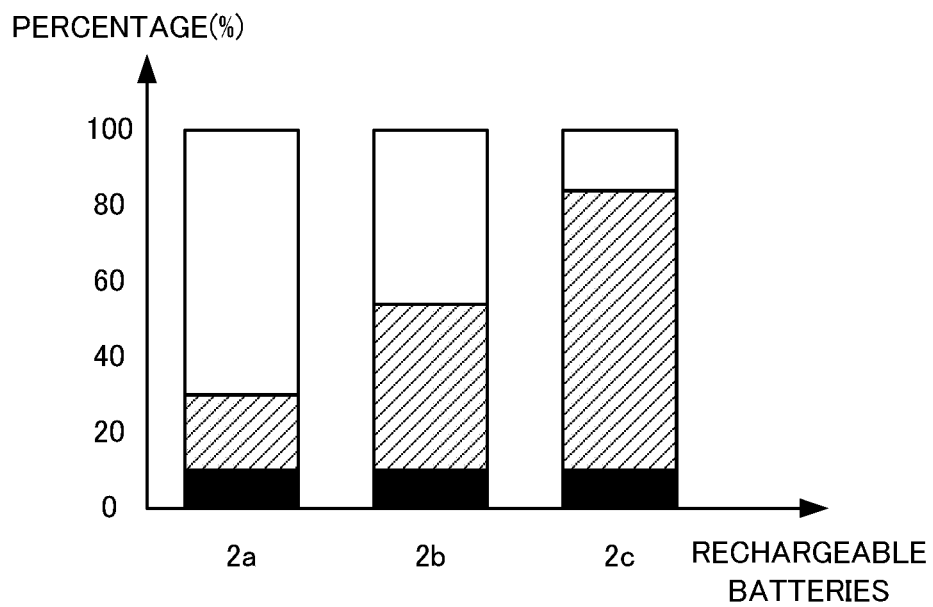
FIG. 5 is a view illustrating an example of a breakdown of types of gas contained in a container at the time when an overcharge test is ended in Embodiment 2.
Figure 6:
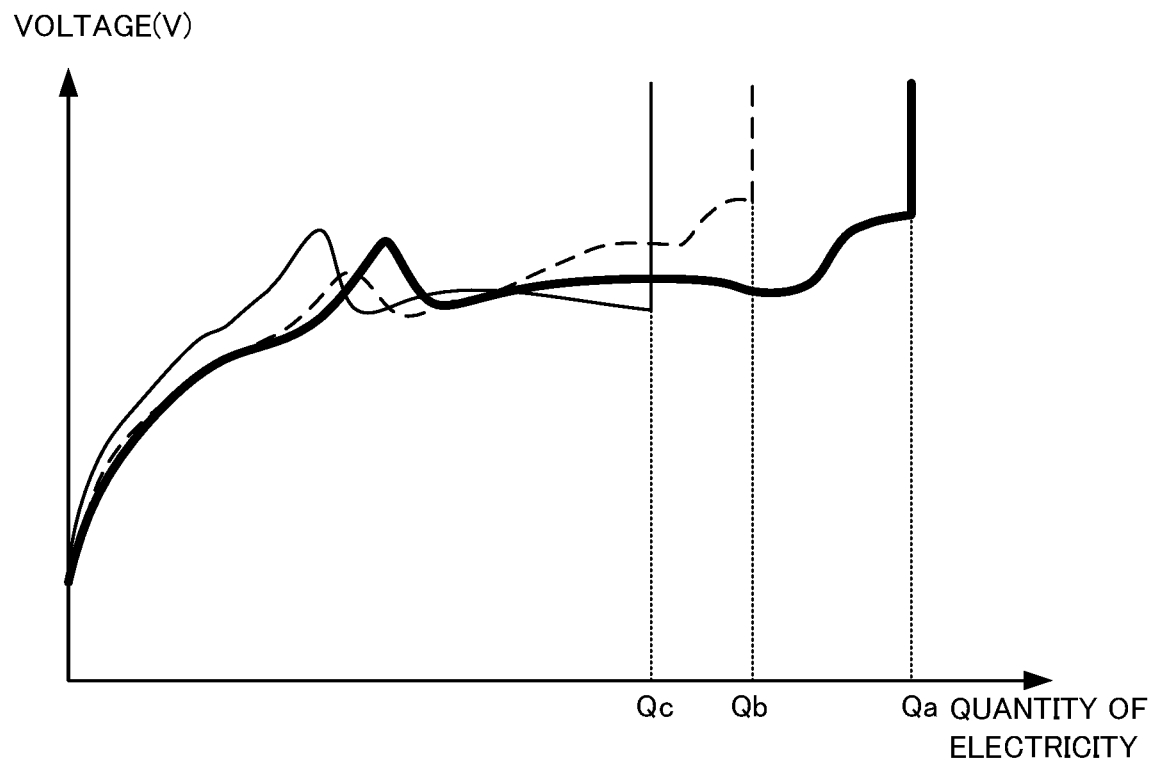
FIG. 6 is a view illustrating an example of a relationship between voltage and quantity of electricity while performing the overcharge test in Embodiment 2.

FIG. 5 is a view illustrating an example of a breakdown of types of gas contained in a container at the time when an overcharge test is ended in Embodiment 2. The blacked-out portions in FIG. 5 indicate the amount of substance $n_0$ of gas contained in a container for the cell 2 in the initial state. The shaded portions in FIG. 5 indicate the amount of substance $n_1$ of gas generated due to deterioration of the cell 2 from the time at which the cell 2 is in the initial state until the overcharge test on the cell 2 is started. The white blank portions in FIG. 5 indicate the amount of substance $n_2$ of gas caused by the overcharge test. FIG. 5 shows that, as the cell 2 deteriorates, the amount of gas caused by the overcharge test until the safety valve is activated declines. FIG. 6 is a view illustrating an example of a relationship between voltage and quantity of electricity while conducting the overcharge test in Embodiment 2. In FIG. 6, quantities of electricity stored in the cells 2a, 2b and 2c during the overcharge test are taken on the horizontal axis, and voltages applied to the cells 2a, 2b and 2c are taken on the vertical axis. The thick solid line corresponds to the cell 2a, the dash line corresponds to the cell 2b and the thin solid line corresponds to the cell 2c. Portions of FIG. 6 indicating rapid increase in voltage show that the safety valve is activated. A quantity of electricity stored in the least deteriorated cell 2a during the overcharge test is Qa. A quantity of electricity stored in the most deteriorated cell 2c during the overcharge test is Qc. Qa is greater than Qc. FIG. 6 shows that, as the cell 2 deteriorates, a quantity of electricity that the cell 2 can store during the overcharge test until activation of the safety valve declines.

Figure 7:
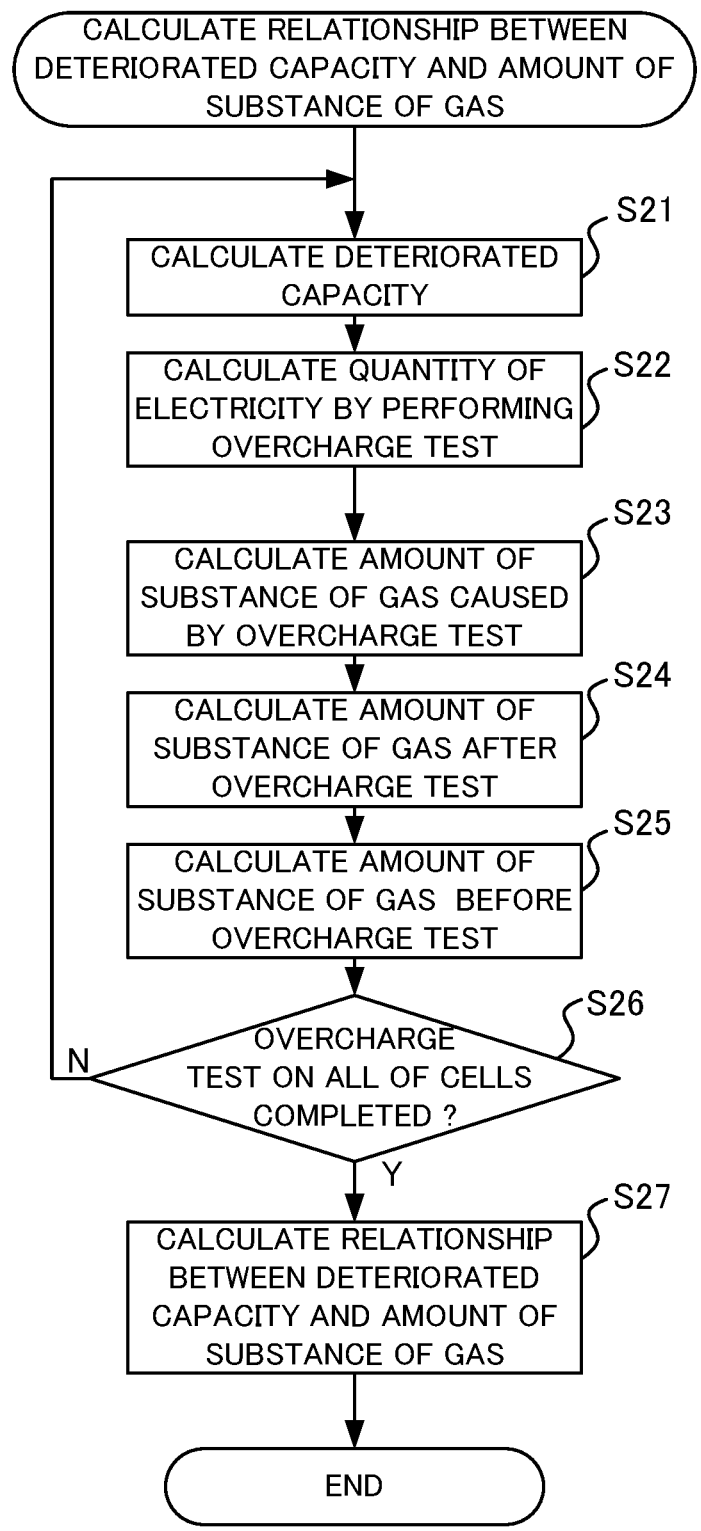
FIG. 7 is a flow chart illustrating a procedure for calculating a relationship between deteriorated capacity and amount of substance of gas contained in the container in Embodiment 2.

A procedure for calculating a relationship between a deteriorated capacity of the cell 2 and an amount of substance of gas contained in a container for the cell 2 through an overcharge test, where the relationship is to be stored in the storage 15, is described below. FIG. 7 is a flow chart illustrating a procedure for calculating a relationship between deteriorated capacity and amount of substance of gas contained in the container in Embodiment 2. A deteriorated capacity of the cell 2 is calculated (step S21) and a quantity of electricity stored in the cell 2 during an overcharge test of the cells 2 is calculated (step S22). The deteriorated capacity may be calculated using the deteriorated capacity calculator 11. The quantity of electricity can be obtained by taking the integral of electric current detected by the current detector 6 over the period for which the overcharge test is performed. The amount of substance of gas caused by the overcharge test is calculated by identifying the gas caused by the overcharge test through a componential analysis or a quantitative analysis (step S23).

The gas caused by the overcharge test differs from the gas generated by deterioration of the cell 2. A principal component of the gas caused by the overcharge test is, for example, carbon dioxide. In the case where a principal component of the gas caused by the overcharge test is carbon dioxide, an amount of the gas caused by the overcharge test can be estimated by measuring carbon dioxide concentration of the gas discharged by activation of the safety valve. In the case where lithium cobalt oxide ($LiCoO_2$), for example, is used as material for a positive electrode, cobalt oxide ($CoO_2$) and a lithium ions are generated when the cell 2 is in an overcharging state in which a voltage beyond an acceptable range of charging voltages is applied to the cell 2. Cobalt oxide is unstable and emits an oxide. Carbon dioxide is generated by oxidization of the emitted oxide to an electrolyte. In the case where lithium cobalt oxide is used as material for the positive electrode and an electrolyte containing dimethyl carbonate as a principal component is used, the formula of a chemical reaction in the overcharging state is expressed by formula (6) below. Formula (6) shows that ⅓ moles of carbon dioxides are generated per mole of electrons.

[Formula 6]

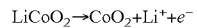

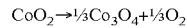

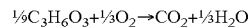

$$\tfrac{1}{3}C_3H_6O_3 + \tfrac{1}{3}O_2 \rightarrow CO_2 + \tfrac{1}{3}H_2O \qquad (6)$$

If a chemical reaction formula expressing generation of the gas caused by the overcharge test can be identified through a componential analysis of or a quantitative analysis of the gas caused by the overcharge test, the amount of substance $n_2$ of the gas caused by the overcharge test can be calculated. When a quantity of electricity stored in the cell 2 during an overcharge test is represented by the symbol, "Q" (Unit: C), and an amount of substance of gas generated per mole of electrons is represented by the symbol, "q", in the chemical reaction formula expressing the generation of the gas caused by the overcharge test, the amount of substance $n_2$ of the gas caused by the overcharge test can be calculated using the Faraday constant F and Formula (7) described below. The symbol, "Q", described in formula (7) denotes a quantity of electricity calculated in step S22.

[Formula 7]

$$n_2 = \frac{Q}{F} \cdot q \qquad (7)$$

Using a value $P_2$ of the pressure at which the safety valve is activated and a value $T_2$ of the temperature detected by the temperature detector 7 at the time when the safety valve is activated, the amount of substance of the gases contained in a container for the cell 2 at the time when the safety valve is activated, or at the end of the overcharge test, is calculated as expressed by formula (8) described below (step S24).

[Formula 8]

$$n_0 + n_1 + n_2 = \frac{P_2 \cdot V}{R \cdot T_2} \qquad (8)$$

By subtracting the amount of substance of the gas calculated using formula (7) described above, "$n_2$", from the amount of substance of the gases calculated using formula (8) described above, "$n_0+n_1+n_2$", the amount of substance of gases contained in the container for the cell 2 at the start of the overcharge test, "$n_0+n_1$", is calculated (step S25). In a case where there is a cell 2, among all of the cells 2 that are to be subjected to the overcharge test, that has not yet undergone processing in steps S21 to S25 (NO in step S26), processing returns to step S21 and the cell 2 that has not yet undergone processing in steps S21 to S25 is subjected to this processing. In the case where all of the cells 2 to be subjected to the overcharge test are subjected to all of steps S21 to S25 (YES in step S26), the relationship between a deteriorated capacity and an amount of substance of gases contained in a container for a cell 2, "$n_0+n_1$", is calculated based on deteriorated capacities of the cells 2 different in deteriorated capacity and the amounts of substance of gases contained in the respective containers, "$n_0+n_1$" (step S27).

The relationship between a deteriorated capacity and an amount of substance of gases contained in a container, "$n_0+n_1$", that is calculated in step S27 is stored beforehand on the storage 15.

The gas amount calculator 12 maintains the relationship between a deteriorated capacity and an amount of substance of gas contained in a container, the relationship being obtained beforehand through the procedure illustrated in FIG. 7. The gas amount calculator 12 calculates an amount of substance of gas contained in a container for a cell 2 using a deteriorated capacity calculated by the deteriorated capacity calculator 11 and based on the relationship between a deteriorated capacity and an amount of substance of gas contained in a container. Operations of a pressure calculator 13 and a pressure monitor 14 for Embodiment 2 are similar to those for Embodiment 1.

Figure 8:
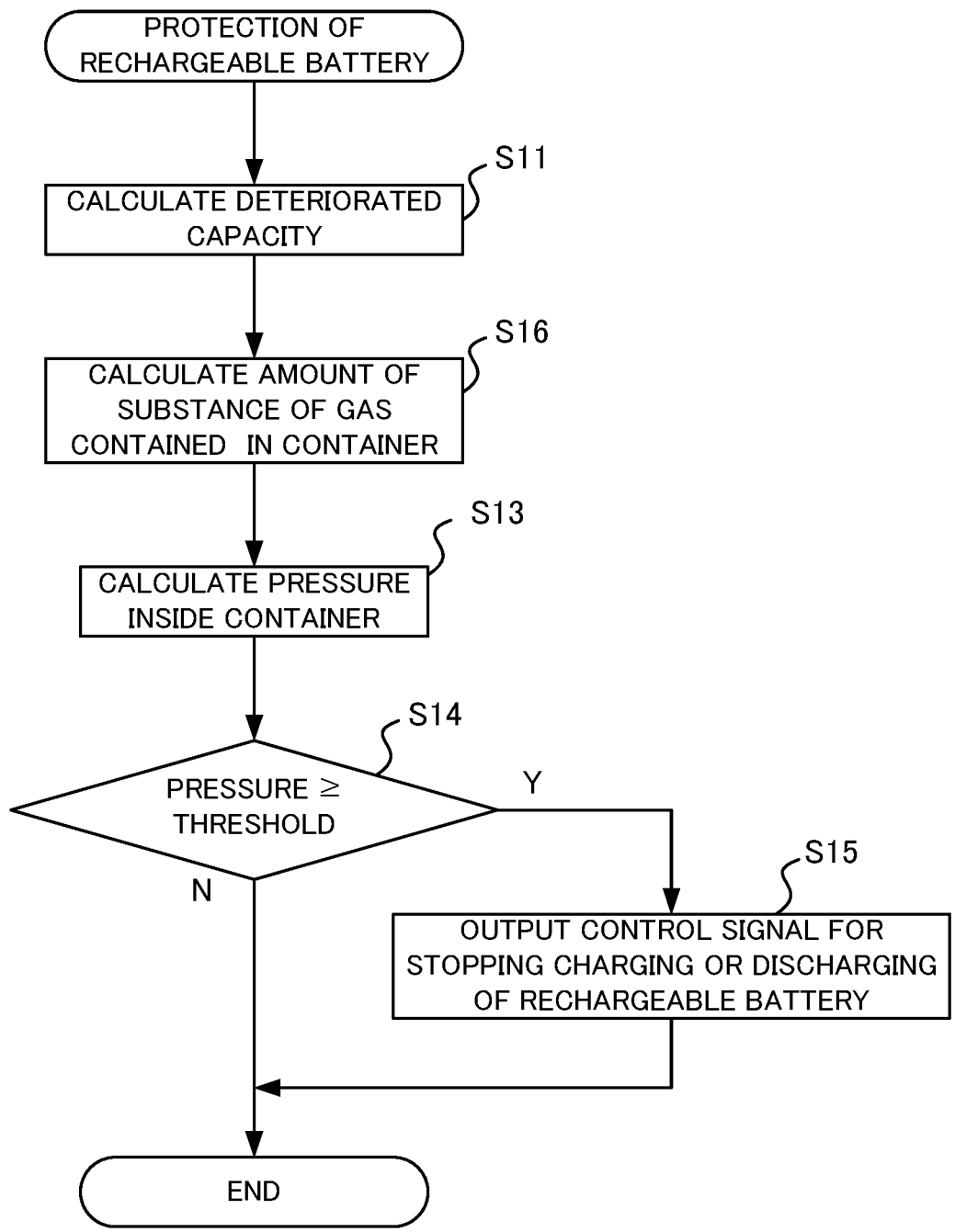
FIG. 8 is a flow chart illustrating an example of an operation of a process of rechargeable battery protection that is performed by a rechargeable battery protecting apparatus according to Embodiment 2.

FIG. 8 is a flow chart illustrating an example of an operation of a process of rechargeable battery protection that is performed by a rechargeable battery protecting apparatus according to Embodiment 2. Steps S11, S13, S14 and S15 are the same as those performed by the rechargeable battery protecting apparatus 10 according to Embodiment 1 illustrated in FIG. 3. Unlike Embodiment 1, the gas amount calculator 12 calculates an amount of substance of gas contained in a container for the cell 2 using a deteriorated capacity calculated by the deteriorated capacity calculator 11 and based on the relationship between a deteriorated capacity and an amount of substance of gas contained in a container (step S16).

As described above, the rechargeable battery protecting apparatus 10 according to Embodiment 2 of the present disclosure can calculate an amount of gas contained in a container based on the relationship between a deteriorated capacity and an amount of substance of gas contained in a container at the start of an overcharge test, the relationship being calculated beforehand by performing the overcharge test and being stored in the storage 15, even though constituents of an electrolyte are unknown.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Power storage system
2, 2a, 2b, 2c Cell
3 Rechargeable battery
4 Charging-discharging controller
5 Voltage detector
6 Current detector
7 Temperature detector
10 Rechargeable battery protecting apparatus
11 Deteriorated capacity calculator
12 Gas amount calculator
13 Pressure calculator
14 Pressure monitor
15 Storage
21 Power generator
22 Electric motor

The invention claimed is:

1. A rechargeable battery protecting apparatus comprising:
a deteriorated capacity calculator to calculate, from a voltage and a current of a cell contained in a rechargeable battery, a deteriorated capacity that is a capacity by which a capacity of the cell that is in an initial state is reduced;
a gas amount calculator to calculate, from the deteriorated capacity calculated by the deteriorated capacity calculator, an amount of gas contained in a container for the cell;
a pressure calculator to calculate pressure inside of the container from the amount of the gas calculated by the gas amount calculator, a void volume of the container for the cell, and a temperature of the cell; and
a pressure monitor to determine whether to output a control signal for protecting the rechargeable battery based on whether pressure inside of a container that is calculated by the pressure calculator is equal to or greater than a threshold pressure with respect to at least one cell.

2. The rechargeable battery protecting apparatus according to claim 1, wherein
the pressure monitor outputs the control signal for protecting the rechargeable battery when pressure inside of the container that is calculated by the pressure calculator is equal to or greater than the threshold pressure with respect to at least one cell, wherein the control signal is for stopping charging or discharging of the rechargeable battery.

3. The rechargeable battery protecting apparatus according to claim 2, wherein
the gas amount calculator calculates
an amount of substance of gas generated due to deterioration of the cell from the deteriorated capacity and a formula of a chemical reaction of an electrolyte caused by the deterioration of the cell, and
sum of the amount of substance of gas generated due to the deterioration of the cell and an amount of substance of gas contained in the container for the cell when the cell is in the initial state, as the amount of gas contained in the container.

4. The rechargeable battery protecting apparatus according to claim 2 further comprising a storage storing a relationship between the deteriorated capacity and the amount of substance of the gas contained in the container at the start of an overcharge test, the relationship being obtained by performing the overcharge test in which each of the cells different from one another in deteriorated capacity is charged by applying to each of the cells a voltage beyond a range of charging voltages defined for the cells until pressure of the inside of the container reaches pressure at which a safety valve for discharging the gas contained in the container is activated, wherein
the gas amount calculator calculates the amount of the gas from the deteriorated capacity calculated by the deteriorated capacity calculator based on the relationship between the deteriorated capacity and the amount of substance of the gas contained in the container at the start of the overcharge test, the relationship being stored in the storage.

5. A power storage system comprising:
a rechargeable battery including a cell
a voltage detector to detect a voltage of the cell;
a current detector to detect a current of the cell;
a temperature detector to detect a temperature of the cell;

a rechargeable battery protecting apparatus according to claim 2; and a charging-discharging controller to charge the rechargeable battery with power supplied from a power generator or supply, to an electric motor, power discharged from the rechargeable battery and to stop charging or discharging of the rechargeable battery upon receiving from the pressure monitor the control signal.

6. The power storage system according to claim 5, wherein the gas amount calculator of the rechargeable battery protecting apparatus calculates an amount of substance of gas generated due to deterioration of the cell from the deteriorated capacity and a formula of a chemical reaction of an electrolyte caused by the deterioration of the cell, and sum of the amount of substance of the gas generated due to the deterioration of the cell and an amount of substance of gas contained in the container for the cell when the cell is in the initial state, as the amount of gas contained in the container.

7. The power storage system according to claim 5, wherein:

the rechargeable battery protecting apparatus further comprises a storage storing a relationship between the deteriorated capacity and the amount of substance of the gas contained in the container at the start of an overcharge test, the relationship being obtained by performing the overcharge test in which each of the cells different from one another in deteriorated capacity is charged by applying to each of the cells a voltage beyond a range of charging voltages defined for the cells until pressure of the inside of the container reaches pressure at which a safety valve for discharging the gas contained in the container is activated; and the gas amount calculator of the rechargeable battery protecting apparatus calculates the amount of the gas from the deteriorated capacity calculated by the deteriorated capacity calculator of the rechargeable battery protecting apparatus based on the relationship between the deteriorated capacity and the amount of substance of the gas contained in the container at the start of the overcharge test, the relationship being stored in the storage.

8. The rechargeable battery protecting apparatus according to claim 1, wherein the gas amount calculator calculates an amount of substance of gas generated due to deterioration of the cell from the deteriorated capacity and a formula of a chemical reaction of an electrolyte caused by the deterioration of the cell, and sum of the amount of substance of the gas generated due to the deterioration of the cell and an amount of substance of gas contained in the container for the cell when the cell is in the initial state, as the amount of gas contained in the container.

9. The rechargeable battery protecting apparatus according to claim 1 further comprising a storage storing a relationship between the deteriorated capacity and the amount of substance of the gas contained in the container at the start of an overcharge test, the relationship being obtained by performing the overcharge test in which each of the cells different from one another in deteriorated capacity is charged by applying to each of the cells a voltage beyond a range of charging voltages defined for the cells until pressure of the inside of the container reaches pressure at which a safety valve for discharging the gas contained in the container is activated, wherein the gas amount calculator calculates the amount of the gas from the deteriorated capacity calculated by the deteriorated capacity calculator based on the relationship between the deteriorated capacity and the amount of substance of the gas contained in the container at the start of the overcharge test, the relationship being stored in the storage.

10. A power storage system comprising:

a rechargeable battery including a cell a voltage detector to detect a voltage of the cell;

a current detector to detect a current of the cell;

a temperature detector to detect a temperature of the cell;

a rechargeable battery protecting apparatus according to claim 1; and a charging-discharging controller to charge the rechargeable battery with power supplied from a power generator or supply, to an electric motor, power discharged from the rechargeable battery and to stop charging or discharging of the rechargeable battery upon receiving from the pressure monitor the control signal.

11. The power storage system according to claim 10, wherein the gas amount calculator of the rechargeable battery protecting apparatus calculates an amount of substance of gas generated due to deterioration of the cell from the deteriorated capacity and a formula of a chemical reaction of an electrolyte caused by the deterioration of the cell, and sum of the amount of substance of the gas generated due to the deterioration of the cell and an amount of substance of gas contained in the container for the cell when the cell is in the initial state, as the amount of gas contained in the container.

12. The power storage system according to claim 10, wherein:

the rechargeable battery protecting apparatus further comprises a storage storing a relationship between the deteriorated capacity and the amount of substance of the gas contained in the container at the start of an overcharge test, the relationship being obtained by performing the overcharge test in which each of the cells different from one another in deteriorated capacity is charged by applying to each of the cells a voltage beyond a range of charging voltages defined for the cells until pressure of the inside of the container reaches pressure at which a safety valve for discharging the gas contained in the container is activated; and the gas amount calculator of the rechargeable battery protecting apparatus calculates the amount of the gas from the deteriorated capacity calculated by the deteriorated capacity calculator of the rechargeable battery protecting apparatus based on the relationship between the deteriorated capacity and the amount of substance of the gas contained in the container at the start of the overcharge test, the relationship being stored in the storage.

\* \* \* \* \*